US012776982B2

(12) United States Patent
Tsugami et al.

(10) Patent No.: US 12,776,982 B2
(45) Date of Patent: Oct. 27, 2026

(54) SYSTEM, METHOD AND PROGRAM FOR COLLECTING DATA

(71) Applicant: NTT, Inc., Tokyo (JP)

(72) Inventors: Ryohei Tsugami, Musashino (JP); Tatsuya Fukui, Musashino (JP)

(73) Assignee: NTT, Inc., Tokyo (JP)

( * ) Notice: Subject to any disclaimer, the term of this patent is extended or adjusted under 35 U.S.C. 154(b) by 107 days.

(21) Appl. No.: 18/837,920

(22) PCT Filed: Feb. 25, 2022

(86) PCT No.: PCT/JP2022/007873

§ 371 (c)(1),
(2) Date: Aug. 13, 2024

(87) PCT Pub. No.: WO2023/162134

PCT Pub. Date: Aug. 31, 2023

(65) Prior Publication Data

US 2025/0141784 A1 May 1, 2025

(51) Int. Cl.
*H04L 45/24* (2022.01)

(52) U.S. Cl.
CPC .................................... *H04L 45/24* (2013.01)

(58) Field of Classification Search
CPC ................................ H04L 45/24; H04L 45/42
See application file for complete search history.

(56) References Cited

U.S. PATENT DOCUMENTS

2024/0314065 A1* 9/2024 Xiong ................... H04W 28/26

FOREIGN PATENT DOCUMENTS

JP H07312768 A * 11/1995
WO WO-2023012878 A1 * 2/2023 ............. H04L 45/70

OTHER PUBLICATIONS

X. Yang, T. Lehman, K. Ogaki and M. Tsurusawa, "On M-concurrency path computation and its application in dynamic service Multi-Layer Networks," 2010 14th Conference on Optical Network Design and Modeling (ONDM), Kyoto, Japan, 2010, pp. 1-6, (Year: 2010).*

R. Muñoz, R. Casellas, R. Martinez and R. Vilalta, "PCE: What is It, How Does It Work and What are Its Limitations?," in Journal of Lightwave Technology, vol. 32, No. 4, pp. 528-543, Feb. 15, 2014 (Year: 2014).*

[No Author Listed], "100Gbps with 'one person, one wavelength'—Ultra-low latency without TCP/IP," Nikkei Electronics, Mar. 2021, 40-47, 17 pages (with machine translation).

* cited by examiner

*Primary Examiner* — Messeret F Gebre
(74) *Attorney, Agent, or Firm* — Fish & Richardson P.C.

(57) ABSTRACT

An object of the present disclosure is to provide a system that does not require a large amount of network resources even in a case of collecting data from a large number of data sources. The present disclosure is a system for collecting data from a plurality of data sources to a server, the system including: a path management controller that manages a communication path between the plurality of data sources and the server, in which the path management controller adjusts a section length of the communication path from each of the plurality of data sources to the server so as to shorten a time for generating the communication path for transmitting the data from the plurality of data sources to the server.

7 Claims, 19 Drawing Sheets

Fig. 5

[5]

REQUIREMENT TABLE

DATA SOURCE A

| | ALLOWABLE DELAY TIME | DATA GENERATION FREQUENCY | DATA GENERATION AMOUNT |
|---|---|---|---|
| APPLICATION A | DELAY 1000ms OR LESS | 4 TIMES/s | 5MB |

DATA SOURCE B

| | ALLOWABLE DELAY TIME | DATA GENERATION FREQUENCY | DATA GENERATION AMOUNT |
|---|---|---|---|
| APPLICATION B | DELAY 200ms OR LESS | 10 TIMES/s | 10MB |

DATA SOURCE C

| | ALLOWABLE DELAY TIME | DATA GENERATION FREQUENCY | DATA GENERATION AMOUNT |
|---|---|---|---|
| APPLICATION C | DELAY 100ms OR LESS | 5 TIMES/s | 10MB |

Fig. 9

[9]

TRANSMISSION POLICY TABLE

DATA SOURCE A

| | TRANSMISSION POLICY (PATH GENERATION TIMING) | TRANSMISSION POLICY (PATH RELEASE TIMING) |
|---|---|---|
| APPLICATION A | AFTER 15MB OF DATA IS ACCUMULATED | AFTER DATA TRANSMISSION COMPLETION |

DATA SOURCE B

| | TRANSMISSION POLICY (PATH GENERATION TIMING) | TRANSMISSION POLICY (PATH RELEASE TIMING) |
|---|---|---|
| APPLICATION B | AFTER 20MB OF DATA IS ACCUMULATED | RELEASE PATH WHEN THERE IS NO DATA GENERATION FOR 50ms |

DATA SOURCE C

| | TRANSMISSION POLICY (PATH GENERATION TIMING) | TRANSMISSION POLICY (PATH RELEASE TIMING) |
|---|---|---|
| APPLICATION C | IMMEDIATELY AFTER DATA GENERATION (SAME MEANING AS AFTER DATA GENERATION AMOUNT IS ACCUMULATED) | RELEASE PATH WHEN THERE IS NO DATA GENERATION FOR 20ms |

Fig. 11

[11]

COMMUNICATION PATH MANAGEMENT TABLE

| COMMUNICATION PATH | DATA AMOUNT (GENERATION FREQUENCY) |
|---|---|
| NETWORK DEVICES B−A | 15MB (1 TIME/s) |
| NETWORK DEVICES C−A | 10MB (10 TIMES/s) |
| NETWORK DEVICES E−D | 10MB (5 TIMES/s) |
| NETWORK DEVICE A−SERVER | 15MB (1 TIME/s), 10MB (10 TIMES/s) |
| NETWORK DEVICE D−SERVER | 10MB (5 TIMES/s) |

Fig. 19

[19]

TRANSMISSION POLICY TABLE

DATA SOURCE A

| | TRANSMISSION POLICY (PATH GENERATION TIMING) | TRANSMISSION POLICY (PATH RELEASE TIMING) |
|---|---|---|
| APPLICATION A | AFTER 20MB OF DATA IS ACCUMULATED | AFTER DATA TRANSMISSION COMPLETION |

DATA SOURCE B

| | TRANSMISSION POLICY (PATH GENERATION TIMING) | TRANSMISSION POLICY (PATH RELEASE TIMING) |
|---|---|---|
| APPLICATION B | AFTER 20MB OF DATA IS ACCUMULATED | RELEASE PATH WHEN THERE IS NO DATA GENERATION FOR 45ms |

DATA SOURCE C

| | TRANSMISSION POLICY (PATH GENERATION TIMING) | TRANSMISSION POLICY (PATH RELEASE TIMING) |
|---|---|---|
| APPLICATION C | IMMEDIATELY AFTER DATA GENERATION (SAME MEANING AS AFTER DATA GENERATION AMOUNT IS ACCUMULATED) | RELEASE PATH WHEN THERE IS NO DATA GENERATION FOR 20ms |

SYSTEM, METHOD AND PROGRAM FOR COLLECTING DATA

CROSS-REFERENCE TO RELATED APPLICATIONS

This application is a National Stage application under 35 U.S.C. § 371 of International Application No. PCT/JP2022/007873, having an International Filing Date of Feb. 25, 2022, the disclosure of which is considered part of the disclosure of this application, and is incorporated by reference in its entirety into this application.

TECHNICAL FIELD

The present disclosure relates to communication control for data collection.

BACKGROUND ART

User terminals, sensors, and in-vehicle systems have been developed, and the number of sensors and the data amount generated from each sensor have been greatly increased. When the data is collected in a conventional communication method, there is a possibility that processing of communication on a reception side may become a bottleneck.

As a high-speed data transfer method, remote direct memory access (RDMA) has been studied. In RDMA, data is transferred by DMA (data is directly transferred between, for example, a peripheral device and a main memory (RAM) without passing through a CPU) from a memory of a local computer to a memory of a different remote computer. For this reason, RDMA does not require CPU processing for data transfer, and thus can avoid the bottleneck on the reception side.

A remote transfer technique using this RDMA has been proposed (see, for example, Non Patent Literature 1). However, in Non Patent Literature 1, it is necessary to set a communication path for each flow in advance in order to transfer data by RDMA in a wide area communication network. Therefore, in a case of collecting data from a large number of data sources, a large amount of network resources is required.

CITATION LIST

Non Patent Literature

Non Patent Literature 1: "Hitori 1-hacho" de 100 Gbps datsu TCP/IP de cho-teichien (100 Gbps by "1 person 1 wavelength", ultra-low delay by de-TCP/IP), Nikkei Electronics, 2021-03, P40-47

SUMMARY OF INVENTION

Technical Problem

An object of the present disclosure is to provide a system that does not require a large amount of network resources even in a case of collecting data from a large number of data sources.

Solution to Problem

A system and a method according to the present disclosure are

- a system for collecting data from a plurality of data sources to a server and a method executed by the system, in which
- a path management controller that manages a communication path between the plurality of data sources and the server is included, and
- the path management controller adjusts a section length of the communication path from each of the plurality of data sources to the server so as to shorten a time for generating the communication path for transmitting the data from the plurality of data sources to the server.

A path management controller device and a method according to the present disclosure are

- a path management controller device included in a system for collecting data from a plurality of data sources to a server, and a method executed by the path management controller device, in which
- the path management controller device
- manages a communication path between the plurality of data sources and the server, and
- adjusts a section length of the communication path generated at a time of data transmission from each of the plurality of data sources to the server so as to shorten a generation time of the communication path at the time of data transmission from the plurality of data sources to the server.

Each of the devices such as the controller and the data sources of the present disclosure can also be implemented by a computer and a program, and the program can be recorded in a recording medium or provided through a communication network. A program of the present disclosure is a program for causing a computer to be implemented as each functional unit included in the devices according to the present disclosure, and is a program for causing a computer to execute each step included in a method to be executed by the devices according to the present disclosure.

Advantageous Effects of Invention

According to the present disclosure, it is possible to provide a system that does not require a large amount of network resources even in a case of collecting data from a large number of data sources.

BRIEF DESCRIPTION OF DRAWINGS

FIG. 5 illustrates an example of information stored in a requirement table of each data source.

FIG. 9 illustrates an example of information stored in a transmission policy table.

FIG. 11 illustrates an example of a communication path management table.

FIG. 19 illustrates an example of information stored in a transmission policy table after adjustment.

DESCRIPTION OF EMBODIMENTS

Figure 1:
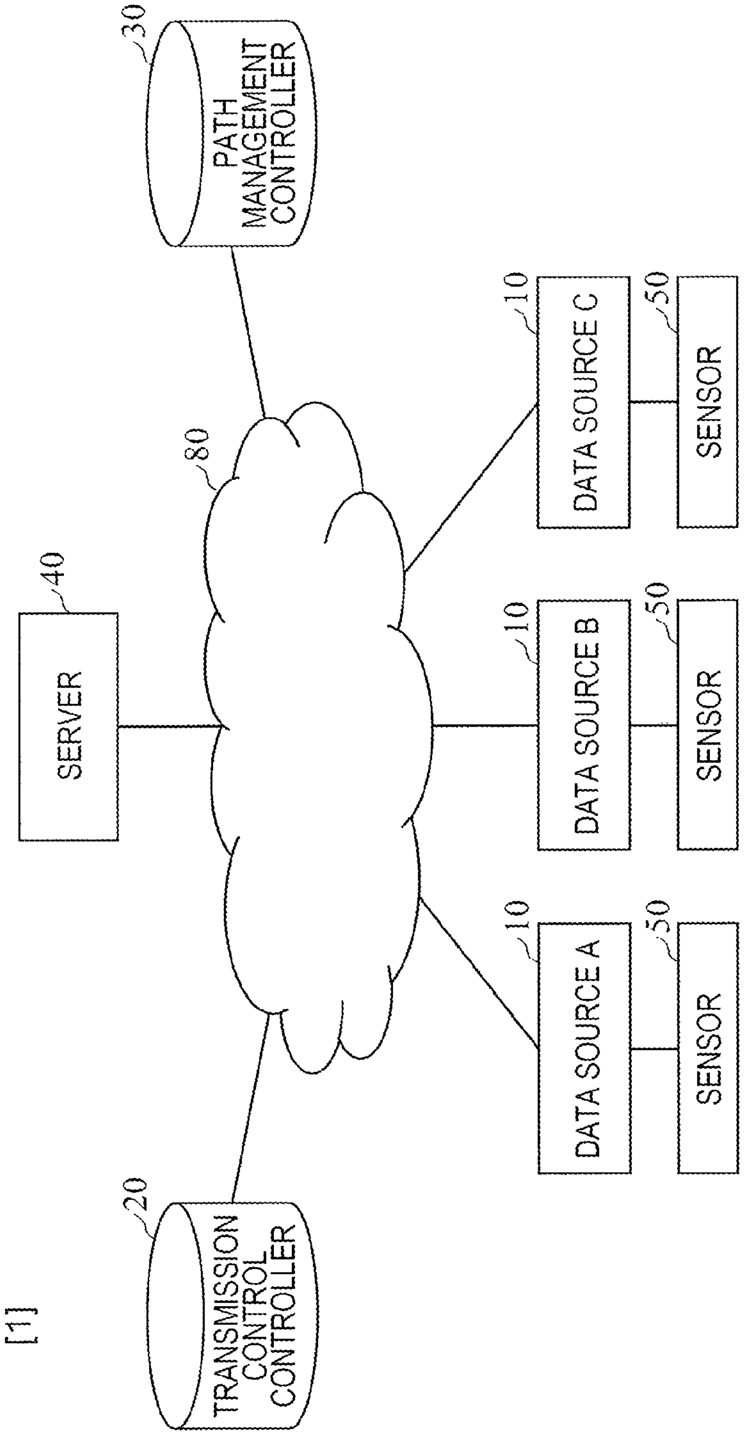
FIG. 1 illustrates a system configuration example of the present disclosure.

Hereinafter, embodiments of the present disclosure will be described in detail with reference to the drawings. The present disclosure is not limited to the embodiments to be described below. These embodiments are merely examples, and the present disclosure can be implemented in a form with various modifications and improvements based on the knowledge of those skilled in the art. Note that components having the same reference numerals in the present specification and the drawings indicate the same components.

First Embodiment

FIG. 1 illustrates a system configuration example of the present disclosure. A system of the present disclosure includes a plurality of data sources 10, a transmission control controller 20, a path management controller 30, and a server 40. The plurality of data sources 10, the transmission control controller 20, the path management controller 30, and the server 40 are connected by a communication network 80. Each of the data sources 10 is a terminal having sensing data on a user side. The server 40 is a terminal that collects data from the data sources.

In the present embodiment, an example in which the transmission control controller 20 and the path management controller 30 are separately arranged is illustrated, but these controllers may be provided in a common device or may be configured by a plurality of devices arranged in a distributed manner. Each device of the present invention can also be implemented by a computer and a program, and the program can be recorded in a recording medium or provided through a communication network.

Figure 2:
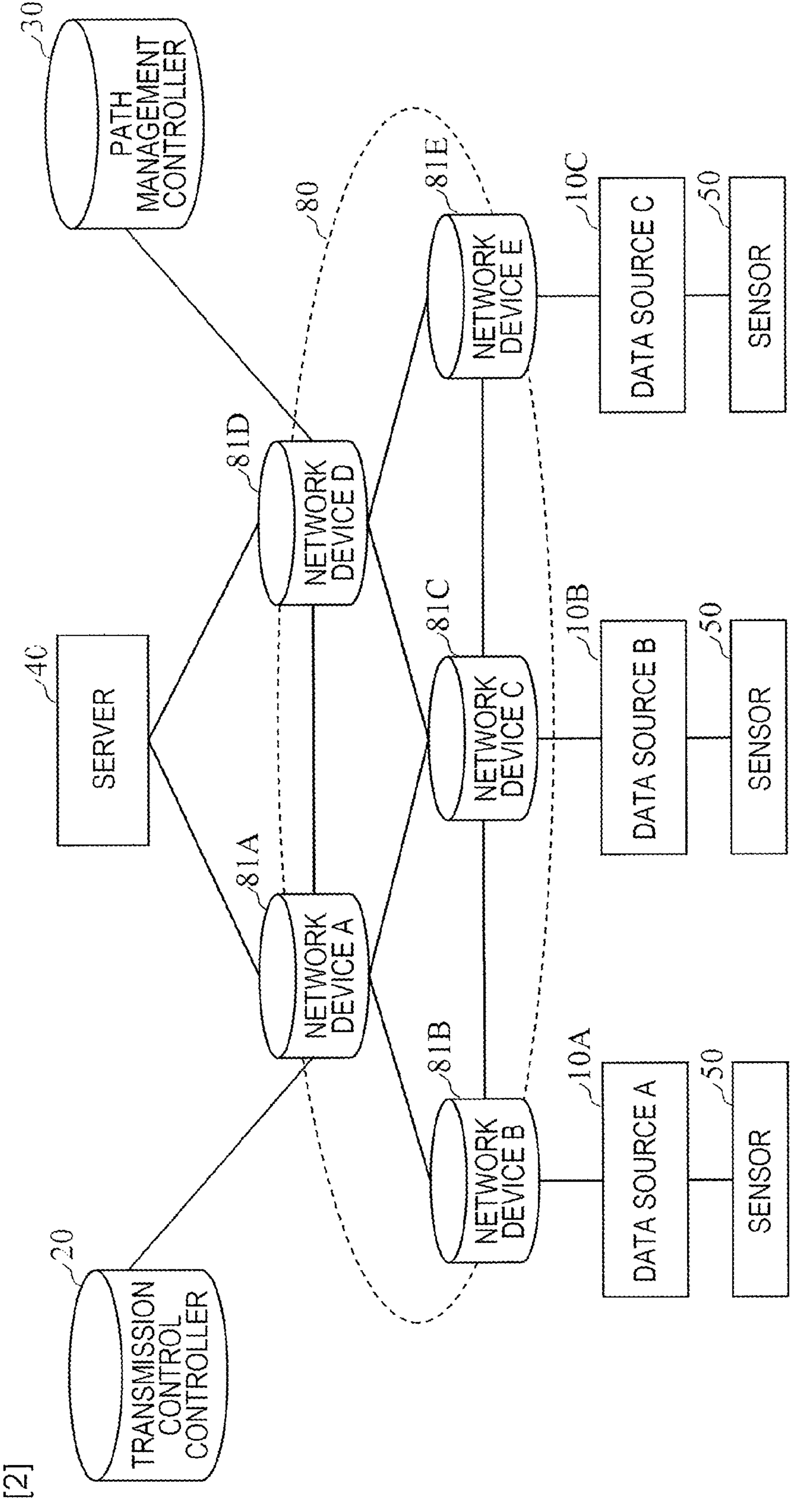
FIG. 2 illustrates a configuration example of a communication network.

FIG. 2 illustrates a configuration example of the communication network 80. The communication network 80 includes a plurality of network devices 81. In the present embodiment, the network devices 81 used between the data sources 10 and the server 40 are determined in advance. For example, a data source 10A and the server 40 are connected by network devices 81A and 81B, a data source 10B and the server 40 are connected by network devices 81A and 81C, and a data source 10C and the server 40 are connected by network devices 81D and 81E.

Each of the network devices 81A to 81E knows to which network device data should be transferred when the data addressed to the server 40 is received from the data sources 10A to 10C. Therefore, even if it is unknown which of the network devices 81 is to be used, the data sources 10A to 10C specify the server 40 and transmit data, whereby the data is transmitted to the server 40. Accordingly, the present disclosure can transfer data in a lossless and broadband manner when a communication path is generated.

The present disclosure proposes a method of allocating a lossless and broadband communication path to the necessary data source 10 at necessary timing in order to implement data transfer by RDMA. In the system of the present disclosure, when data to be transmitted to the server 40 is generated, each of the plurality of data sources 10 generates a communication path using the network device 81 set in the local device at transmission timing set in a transmission policy of the local device. As a result, each data source 10 can autonomously transmit the sensing data to the server 40 on the basis of the transmission policy of the local device.

The transmission policy includes the following examples.

First transmission policy: A communication path is generated and data transfer is performed immediately after data generation, and the communication path is released immediately after data transfer completion.

Second transmission policy: A communication path is generated and data transfer is performed after a certain amount of data is accumulated, and the communication path is released immediately after data transfer completion.

Third transmission policy: A communication path is generated and data transfer is performed immediately after data generation, and the communication path is continuously held for a certain period of time after data transfer completion.

Fourth transmission policy: A communication path is generated and data transfer is performed after a certain amount of data is accumulated, and the communication path is continuously held for a certain period of time after data transfer completion.

In the present embodiment, with the provision of the transmission control controller 20, the transmission policy that matches a data transfer requirement of the data source 10 is distributed. Then, each data source 10 autonomously transmits the sensing data according to the transmission policy in consideration of the sensor characteristic and the data transfer requirement for each application. As a result, the present embodiment controls trade-off between immediacy of data transmission and reduction in communication path use time.

When the communication path is established between the data source 10 and the server 40, communication quality can be secured and data transfer with high reliability can be performed, but it takes time to generate the communication path. Therefore, in the present disclosure, the path management controller 30 adjusts the length of each communication path so as to shorten the generation time of the communication path. Details will be described below.

Figure 3:
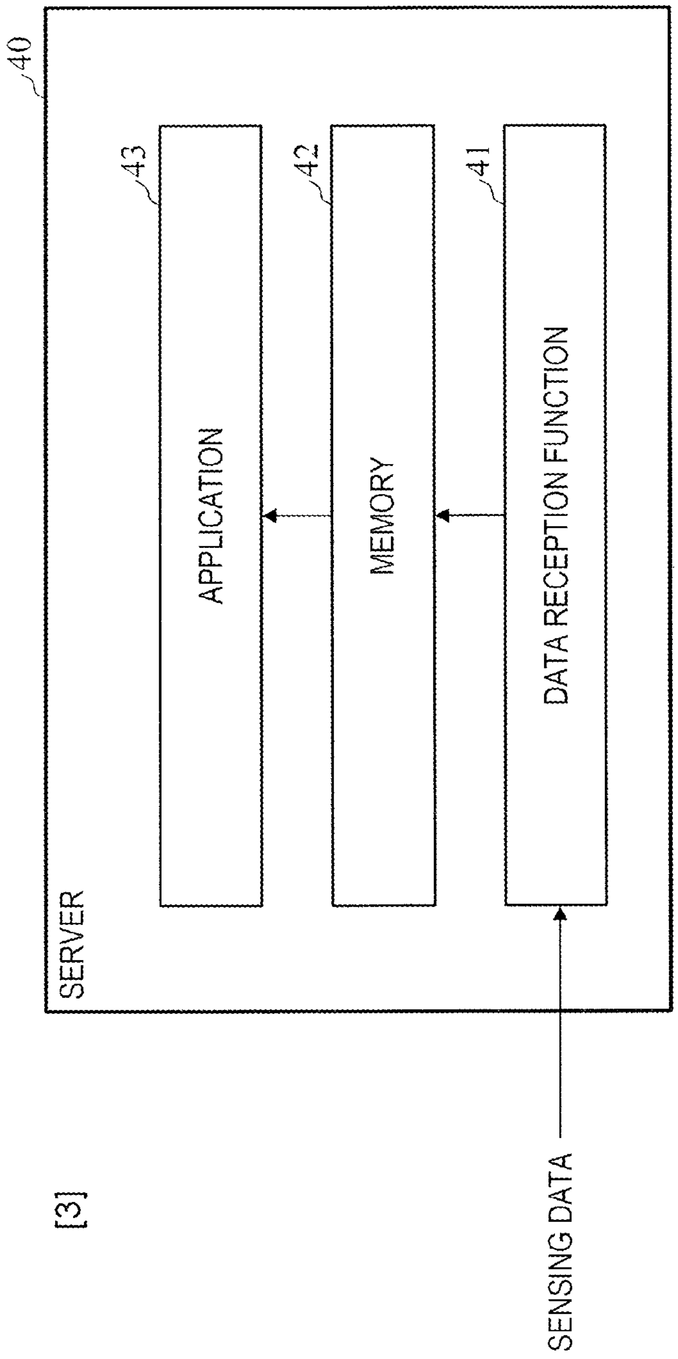
FIG. 3 illustrates a configuration example of a server.

FIG. 3 illustrates a configuration example of the server 40. The server 40 includes a data reception function 41, a memory 42, and an application 43.

The data reception function 41 receives sensing data from each data source 10.

The memory 42 stores sensing data from a sensor 50.

The application 43 collects the sensing data from the sensor 50. The application 43 is any application that collects any sensing data detected or generated by a user terminal, a sensor, an in-vehicle system, or the like.

Figure 4:
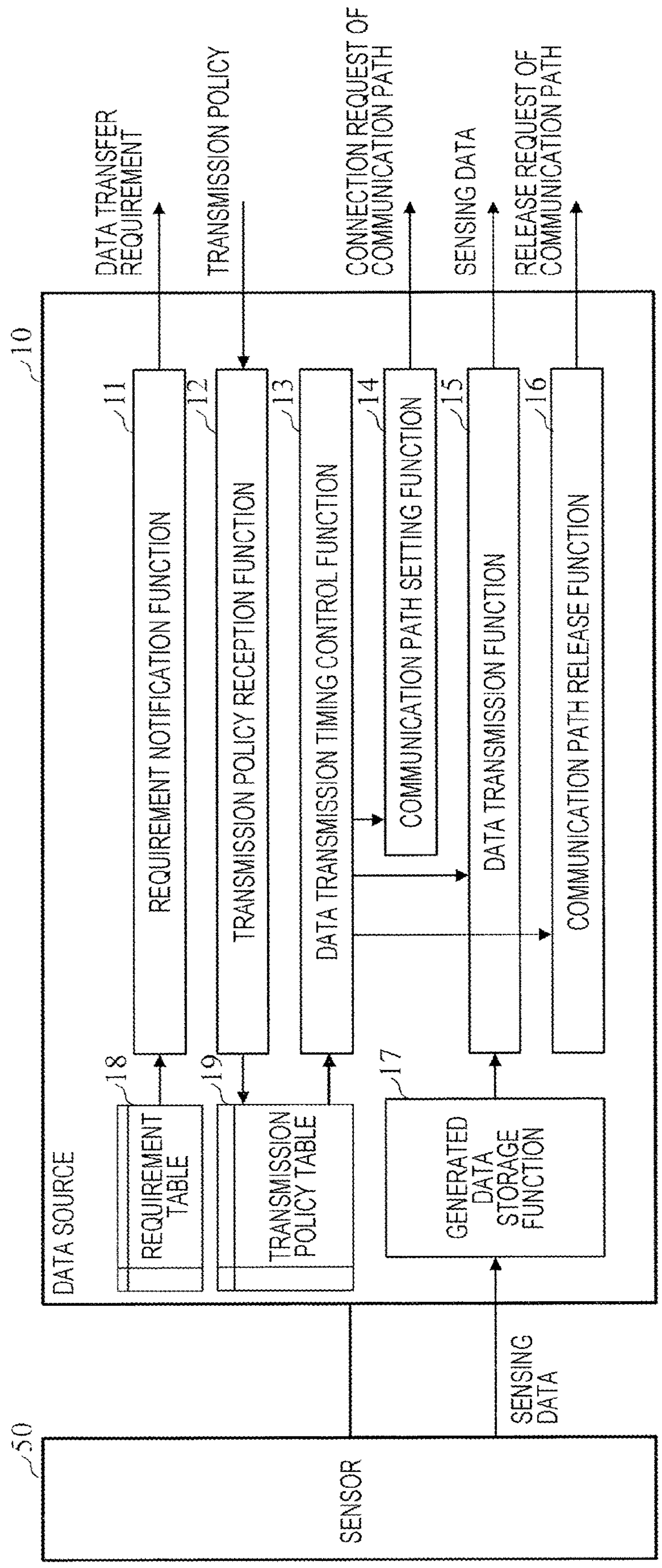
FIG. 4 illustrates a configuration example of a data source.

FIG. 4 illustrates a configuration example of the data source 10. The data source 10 includes a requirement notification function 11, a transmission policy reception function 12, a data transmission timing control function 13, a communication path setting function 14, a data transmission function 15, a communication path release function 16, a generated data storage function 17, a requirement table 18, and a transmission policy table 19.

The generated data storage function 17 stores the sensing data from the sensor 50.

The requirement notification function 11 reads the data transfer requirement from the requirement table 18 and notifies the transmission control controller 20 of the read data transfer requirement.

The transmission policy reception function 12 receives the transmission policy from the transmission control controller 20.

The data transmission timing control function 13 controls the communication path setting function 14, the data transmission function 15, and the communication path release function 16 in accordance with the transmission policy table 19.

The communication path setting function 14 transmits a connection request of a path to the path management controller 30.

The data transmission function 15 transmits the sensing data stored in the generated data storage function 17 to the server 40.

The communication path release function 16 transmits a release request of a path to the path management controller 30.

The requirement table 18 stores the data transfer requirement for each data source 10.

The transmission policy table 19 stores a policy of when the sensing data is transmitted from the data source 10 to the server 40.

FIG. 5 illustrates an example of information stored in the requirement table 18 of each data source. Each requirement table stores, as the data transfer requirement, an allowable delay time, a data generation frequency, and a data generation amount of each data source 10 in association with the application. The allowable delay time is an allowable delay time from generation to arrival of data at the server. The data generation amount is a data amount generated at a time in the sensor 50. The data generation frequency and the data generation amount in the sensor 50 are not limited to be constant. In this case, an average data generation frequency and an average data generation amount, which are average values for each sensor 50, can be used.

Figure 6:
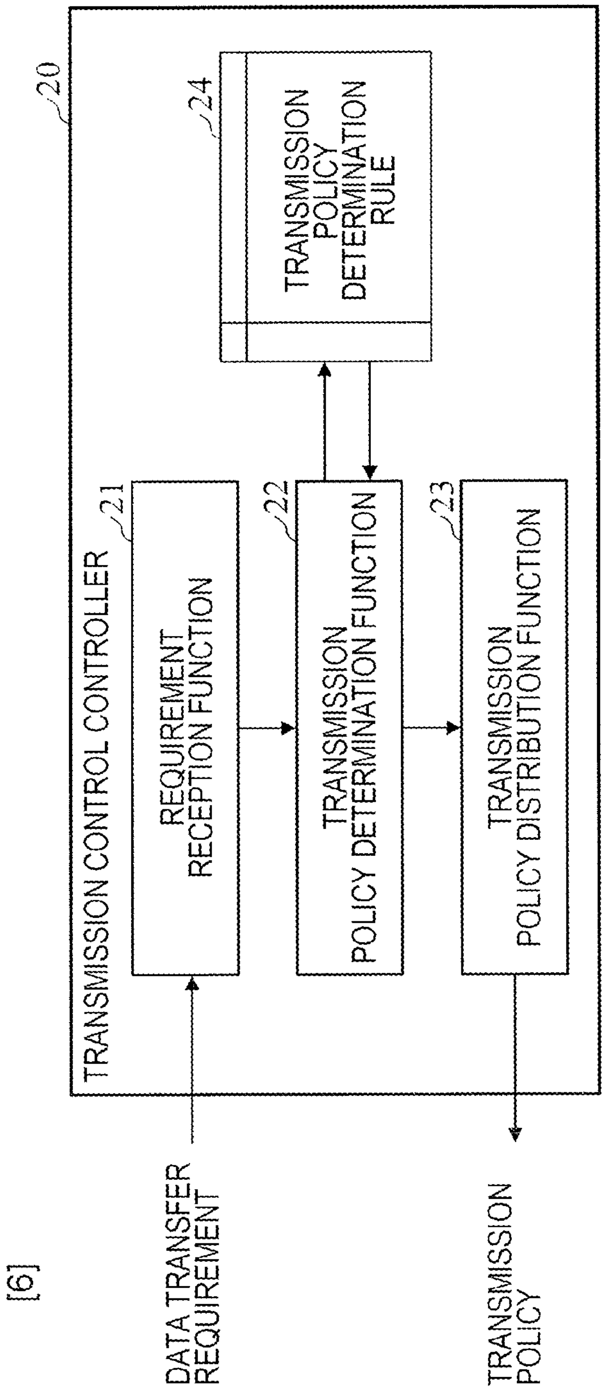
FIG. 6 illustrates a configuration example of a transmission control controller.

FIG. 6 illustrates a configuration example of the transmission control controller 20. The transmission control controller 20 includes a requirement reception function 21, a transmission policy determination function 22, a transmission policy distribution function 23, and a transmission policy determination rule 24.

Figure 7:
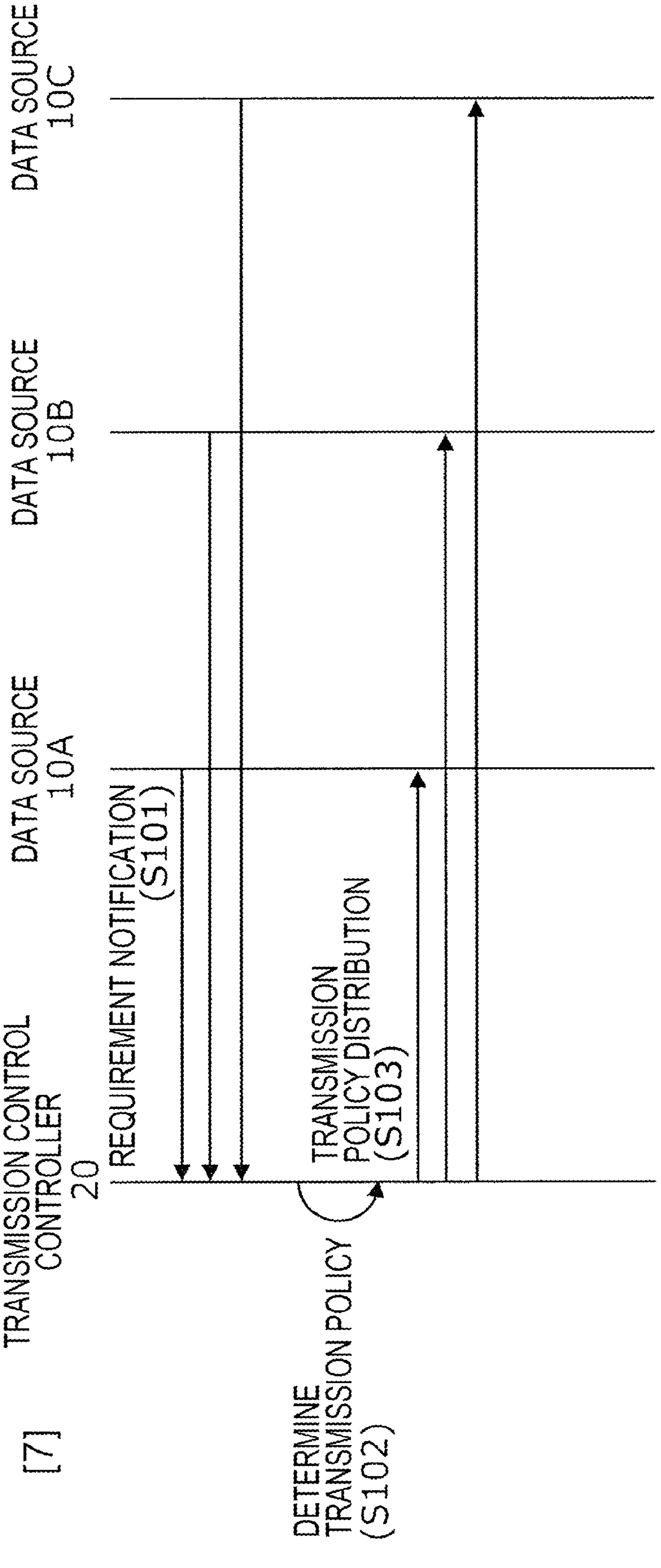
FIG. 7 is an example of a transmission policy determination sequence.

FIG. 7 illustrates an example of an operation in the transmission control controller 20.

Each data source 10 notifies the transmission control controller 20 of the data transfer requirement on the basis of the information of the requirement table 18 (S101). The data transfer requirement includes the allowable delay time and the data generation frequency of each data source 10 as illustrated in FIG. 5.

The requirement reception function 21 of the transmission control controller 20 receives the data transfer requirement from the data source 10. The transmission policy determination function 22 determines the transmission policy for each data source 10 according to the data transfer requirement in accordance with the transmission policy determination rule 24 (S102).

The transmission policy distribution function 23 of the transmission control controller 20 distributes the determined transmission policy to each data source 10 (S103).

Figure 8:
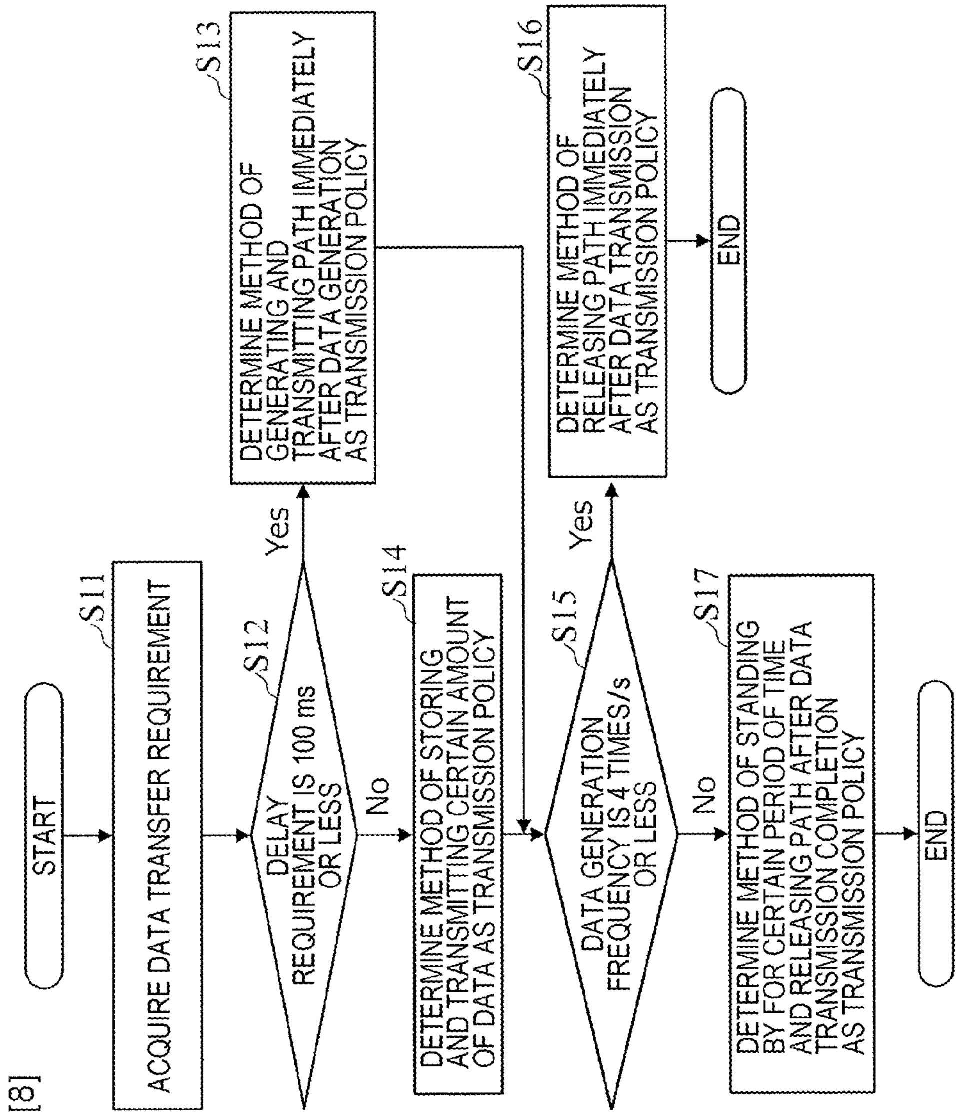
FIG. 8 illustrates an example of an operation in a transmission policy determination function.

FIG. 8 illustrates an example of an operation in the transmission policy determination function 22.

When acquiring data transfer requirement from one of the data source 10 (S11), the transmission control controller 20 determines a requirement for the allowable delay time (S12). In a case where the requirement for the allowable delay time is 100 ms or less (Yes in S12), a method of generating a path and transmitting the data immediately after data generation is determined (S13). On the other hand, in a case where the requirement for the allowable delay time exceeds 100 ms (No in S12), a method of storing a certain amount of sensing data and transmitting the sensing data is determined (S14).

Next, the transmission control controller 20 determines the data generation frequency (S15). In a case where the data generation frequency is 4 times/s or less (Yes in S15), a method of releasing a path immediately after data transmission is determined (S16). On the other hand, in a case where the data generation frequency exceeds 4 times/s (No in S15), a method of waiting for a certain period of time after data transmission completion and releasing a path is determined (S17).

For example, in the case of the data transfer requirement illustrated in FIG. 5, the transmission policy determination function 22 makes a determination as follows:

Data source A:

Since a set time of the allowable delay time is 1000 ms, and a set value of the data generation frequency is 4 times, the transmission control controller 20 determines the second transmission policy as the transmission policy.

Data source B:

Since a set time of the allowable delay time is 200 ms, and a set value of the data generation frequency is 10 times, the transmission control controller 20 determines the fourth transmission policy as the transmission policy.

Data source C:

Since a set time of the allowable delay time is 100 ms, and a set value of the data generation frequency is 5 times, the transmission control controller 20 determines the third transmission policy as the transmission policy.

As a result, the transmission policies as illustrated in FIG. 9 are provided to the data sources A to C.

When receiving the transmission policy from the transmission control controller 20, the data source 10 stores the transmission policy in the transmission policy table 19. As a result, as illustrated in FIG. 9, the transmission policy table 19 of each of the data sources 10 stores the transmission policy suitable for the data source 10.

Here, the data transfer requirement may include application information. In this case, the transmission control controller 20 sets a threshold in consideration of the requirements included in the application information in steps S12 and S15. Further, the transmission policy determined by the transmission policy determination function 22 is transmitted to the path management controller 30.

Figure 10:
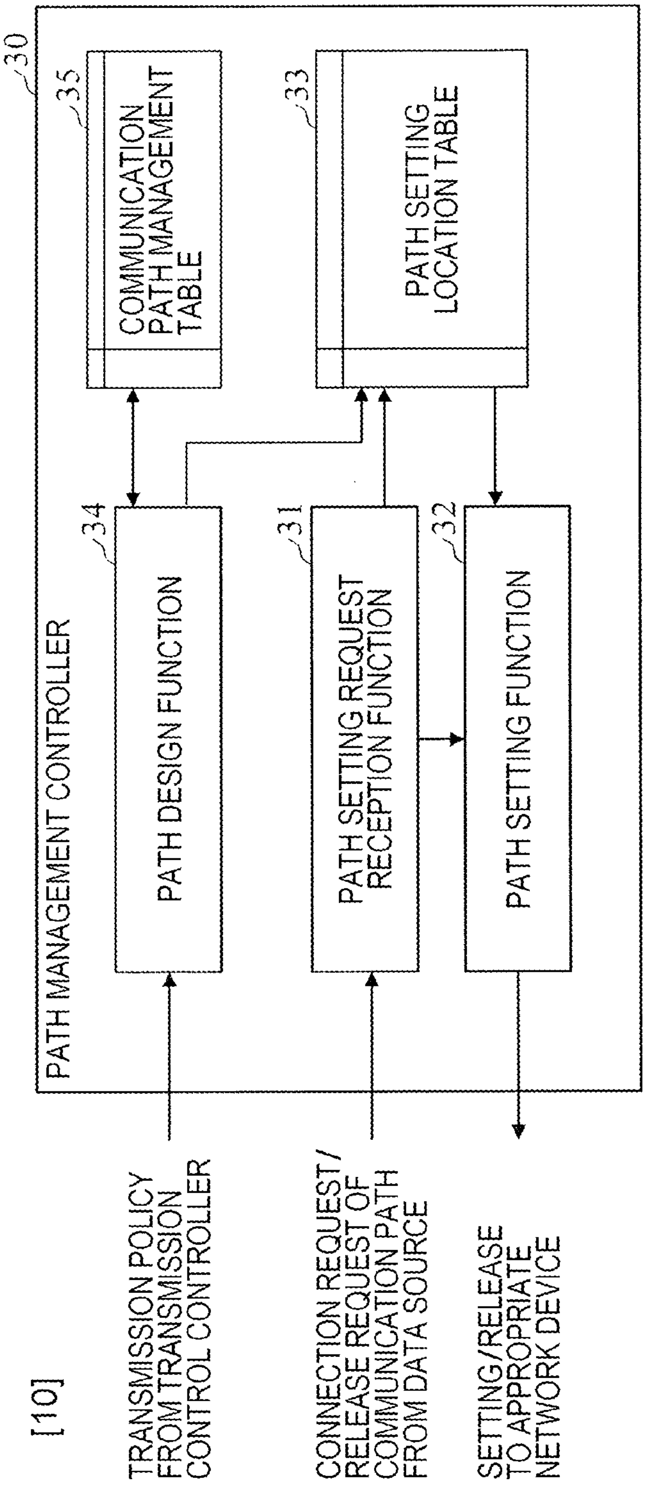
FIG. 10 illustrates a configuration example of a path management controller.

FIG. 10 illustrates a configuration example of the path management controller 30. The path management controller 30 includes a path setting request reception function 31, a path setting function 32, a path setting location table 33, a path design function 34, and a path management table 35.

The path setting request reception function 31 receives the connection request or the release request of the communication path from each data source 10.

The path setting function 32 generates or releases the communication path in accordance with the connection request or the release request of the communication path from each data source 10.

The path setting location table 33 manages setting information (generation/release) of the communication path from each data source 10 to the server 40.

The path design function 34 designs each communication path so that the generation time of the communication path is shortened in a case where the transmission policy from the transmission control controller 20 is executed. The design here is reflected in the path setting location table 33.

The path management table 35 manages the data amount required to execute the transmission policy from the transmission control controller 20 for each path.

In the present embodiment, according to the transmission policy of the data source 10A, data is transmitted after 15 MB of data is accumulated. Since the data generation frequency of the data source 10A is 4 times/s, 15 MB of data is transmitted at a frequency of 1 time/s. Therefore, as illustrated in FIG. 11, the path design function 34 organizes a generation frequency and a release frequency of each communication path and a data traffic in the path management table 35.

The path design function 34 designs the communication path on the basis of the information in the path management table 35. For example, the path design function 34 determines resources to be allocated to each communication path. Here, in a case where a section length of the communication path is short, the time required to generate the communication path becomes short. Therefore, the section length is shortened for a section with a high generation frequency of the communication path. As a result, the path generation time is shortened, and thus data can be immediately transmitted at the time of data generation.

The path design function 34 lengthens the section length for a section with a low generation frequency of the communication path. Since this communication path has a low data generation frequency and a low possibility of contention, the communication path may be exclusively used in a plurality of flows. As a result, new path generation can be reduced, and the generation time of the communication path can be shortened. In addition, the data amount of the communication path may be able to be adjusted depending on the communication path. In such a case, the path design function 34 may allocate a large number of resources to the communication path through which a flow having a large generated data amount passes.

Figure 12:
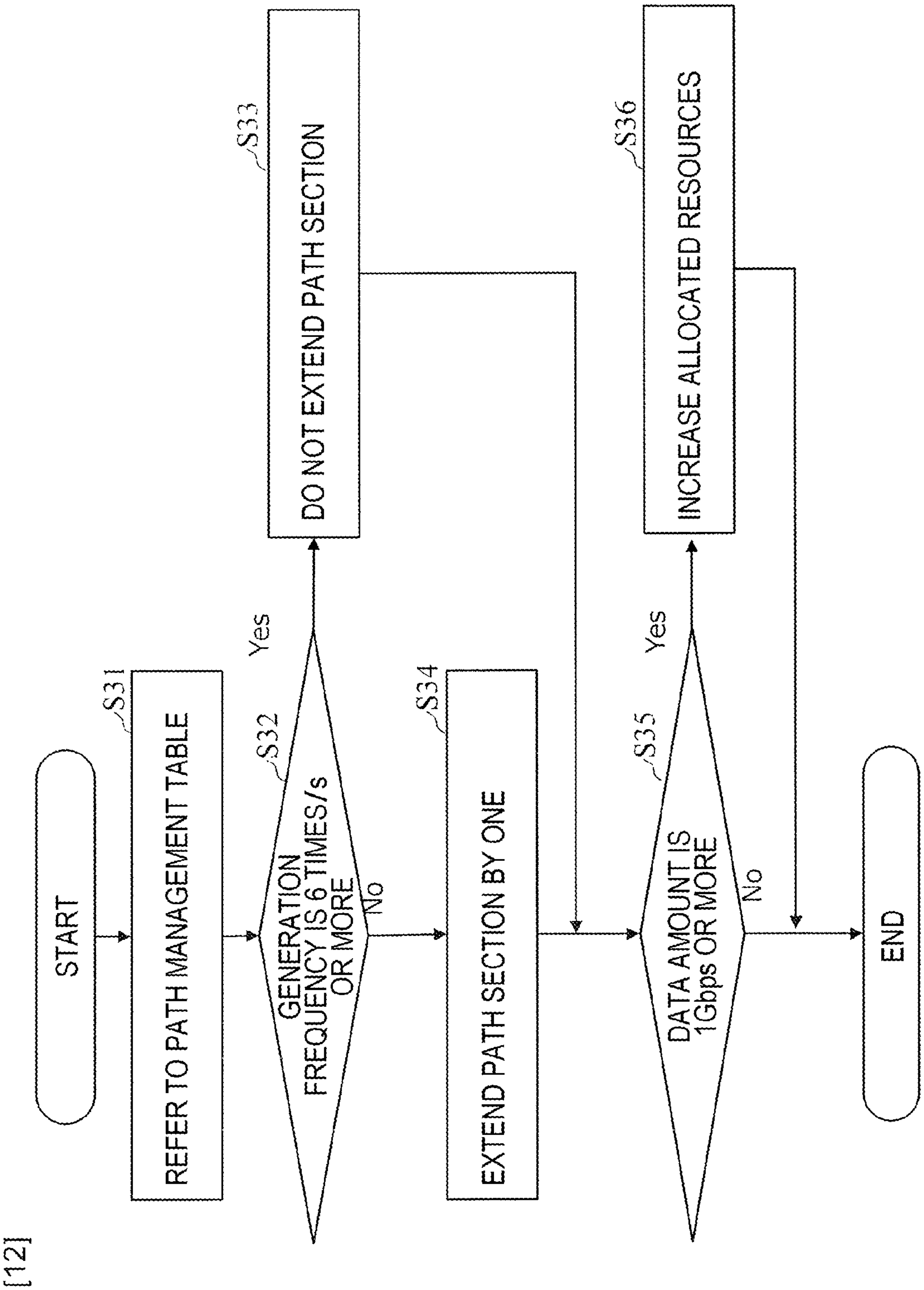
FIG. 12 illustrates an example of an operation of a path design function.

FIG. 12 illustrates an example of an operation of the path design function 34.

The generation frequency and the data amount of the communication path are read from the path management table 35 (S31), and whether the generation frequency of the communication path is a preset threshold (6 times/s in the present embodiment) or more (S32). In a case where the generation frequency is 6 times/s or more, the section length is maintained (S33). On the other hand, in a case where the generation frequency is less than 6 times/s, the communication path is extended by one to the next section (S34).

Whether the data amount of the communication path added in step S33 or S34 is a preset threshold (1 Gbps in the present embodiment) or more (S35). Then, in a case where the data amount is 1 Gbps or more (Yes in S35), the allocated resources of the added communication path are increased (S36).

Figure 13:
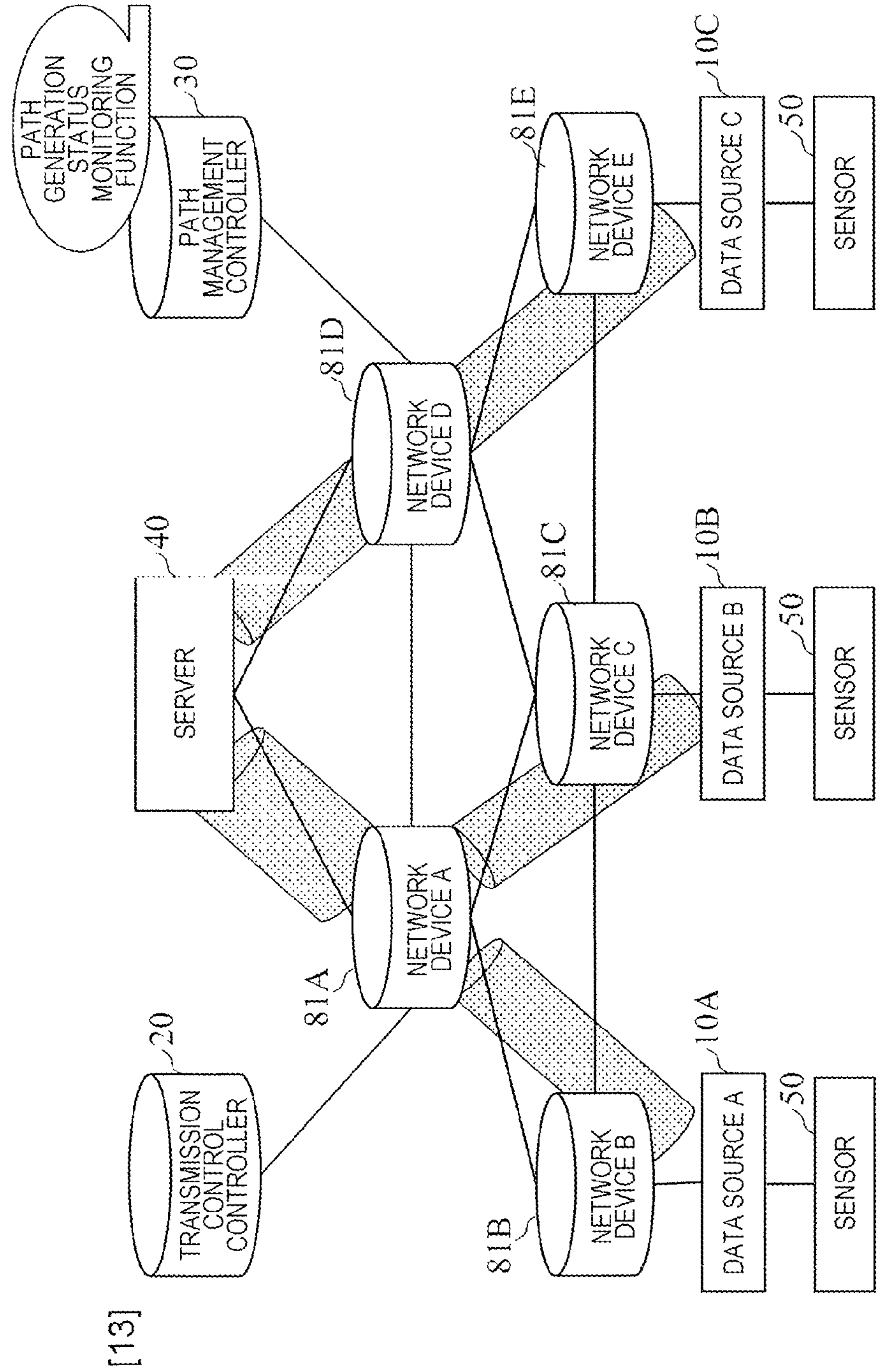
FIG. 13 illustrates a design example of a communication path.

For example, since the generation frequency of the communication path of the data source 10B is 10 times/s, step S33 is executed to divide the communication path by the network devices 81C and 81A. Meanwhile, since the generation frequency of the communication path of the data source 10C is 5 times/s, step S34 is executed to extend the communication path from the network device 81E to the network device 81D to the communication path from the network device 81E to the server 40. Further, at this point of time, there is no communication path with the data amount of 1 Gbps or more. As a result, the communication path as illustrated in FIG. 13 is designed.

In the present embodiment, the sensing data from the data sources 10A and 10B join at the network device 81A. In this case, the network device 81A divides the communication path. For the communication path from the network device 81A to the server 40, the data sources 10A and 10B may individually generate communication paths, but may generate a communication path to use in cooperation in advance. In this case, when a data source that uses the communication path appears, the communication path is allocated to the data source.

An example of setting the communication path in a case where the data sources 10A to 10C transmit the sensing data will be described with reference to FIGS. 14 to 16. In the present embodiment, the communication paths as illustrated in FIG. 13 are designed. Therefore, it is possible to generate the communication path from the data source 10A to the server 40 only by generating the communication path from the network device 81B to the network device 81A, and it is possible to shorten the generation time of the communication path. The same similarly applies to the data source 10B.

Figure 14:
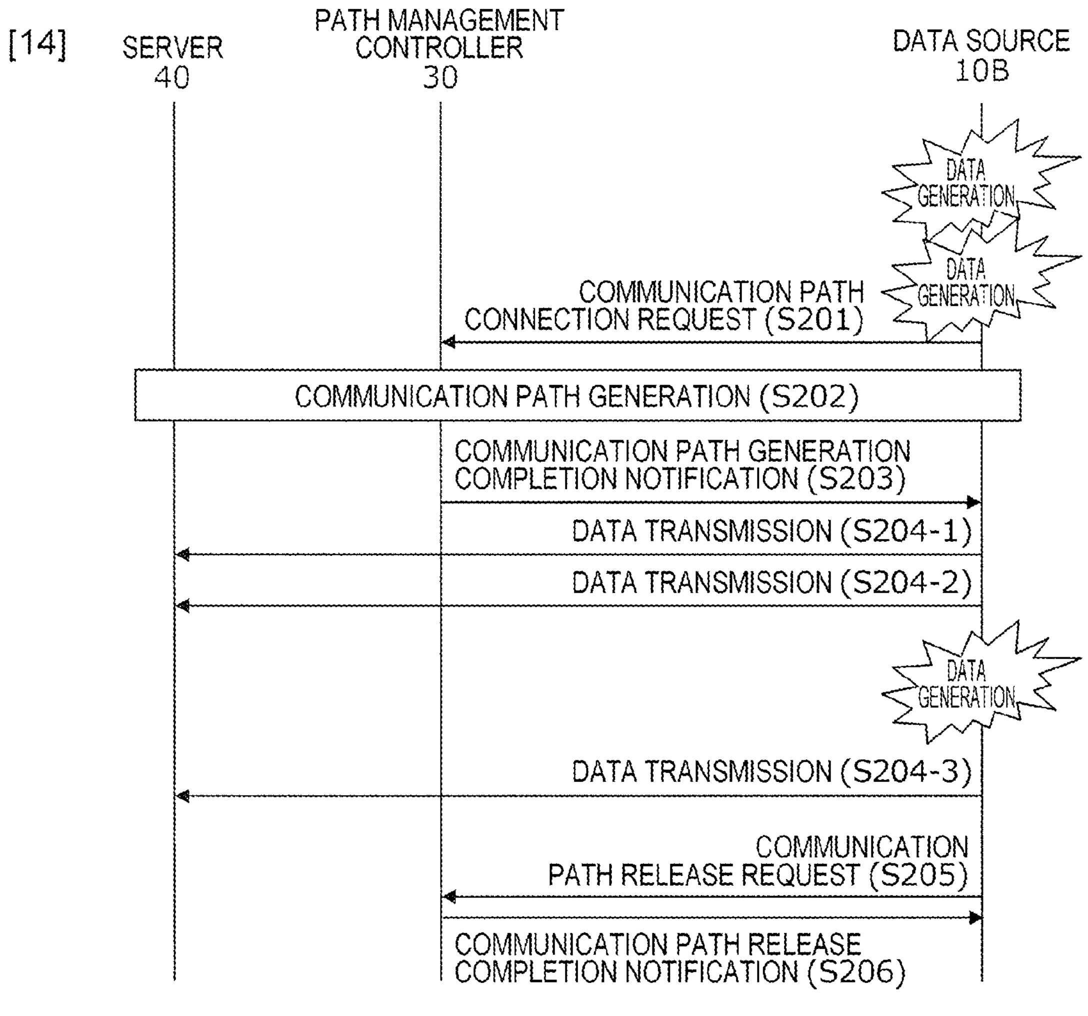
FIG. 14 illustrates an example of transmission of sensing data from a data source B to a server.

FIG. 14 illustrates an example of transmission of sensing data from the data source 10B to the server 40. The data source 10B transmits the sensing data according to the fourth transmission policy.

The data source 10B accumulates the sensing data generated in the sensor 50, and transmits the connection request of the communication path to the path management controller 30 when the data reaches 20 MB (S201).

When receiving the connection request of the communication path, the path management controller 30 sets the communication paths of the network devices 81A and 81C and generates the communication paths (S202). When the generation of the communication paths is completed, the path management controller 30 transmits a communication path generation completion notification to the data source 10B (S203).

When receiving the communication path generation completion notification, the data source 10B transmits the sensing data to the server 40 (S204-1 and S204-2). Transmission of the release request of the communication path is waited for subsequent 50 ms. When sensing data is generated during that time, the sensing data is transmitted each time generated (S204-3).

When 50 ms elapses from the last data transmission (step S204-3), the data source 10B transmits the release request of the communication paths to the path management controller 30 (S205).

When receiving the release request of the communication path, the path management controller 30 releases the communication paths of the network devices 81A and 81C, and transmits a communication path release completion notification indicating that the release of the communication paths is completed to the data source 10B (S206).

Figure 15:
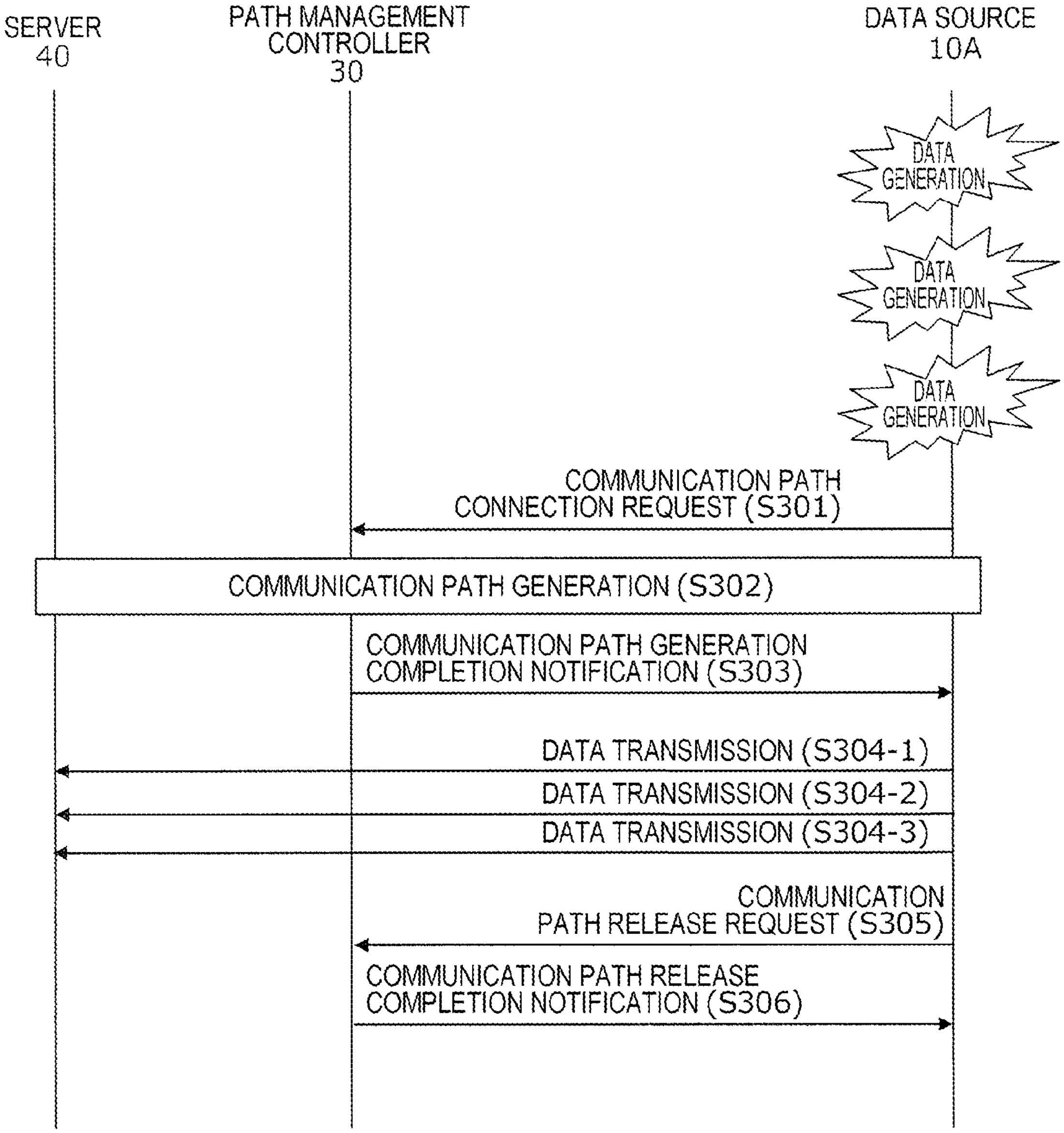
FIG. 15 illustrates an example of transmission of sensing data from a data source A to the server.

FIG. 15 illustrates an example of transmission of sensing data from the data source 10A to the server 40. The data source 10A transmits the sensing data according to the second transmission policy.

The data source 10A accumulates the sensing data generated in the sensor 50, and transmits the connection request of the communication path to the path management controller 30 when the data reaches 15 MB (S301).

When receiving a generation request of the communication path, the path management controller 30 generates the communication path from the network device 81E to the server 40 (S302). When the generation of the communication path is completed, the path management controller 30 transmits the communication path generation completion notification to the data source 10A (S303).

When receiving the communication path generation completion notification (S303), the data source 10A collectively transmits the accumulated sensing data to the server 40 (S304-1, S304-2, and S304-3). Thereafter, the data source 10A immediately transmits the release request of the communication path to the path management controller 30 (S305).

When receiving the release request of the communication paths, the path management controller 30 releases the communication paths of the network devices 81A and 81B, and transmits the communication path release completion notification indicating that the release of the communication paths is completed to the data source 10A (S306).

Figure 16:
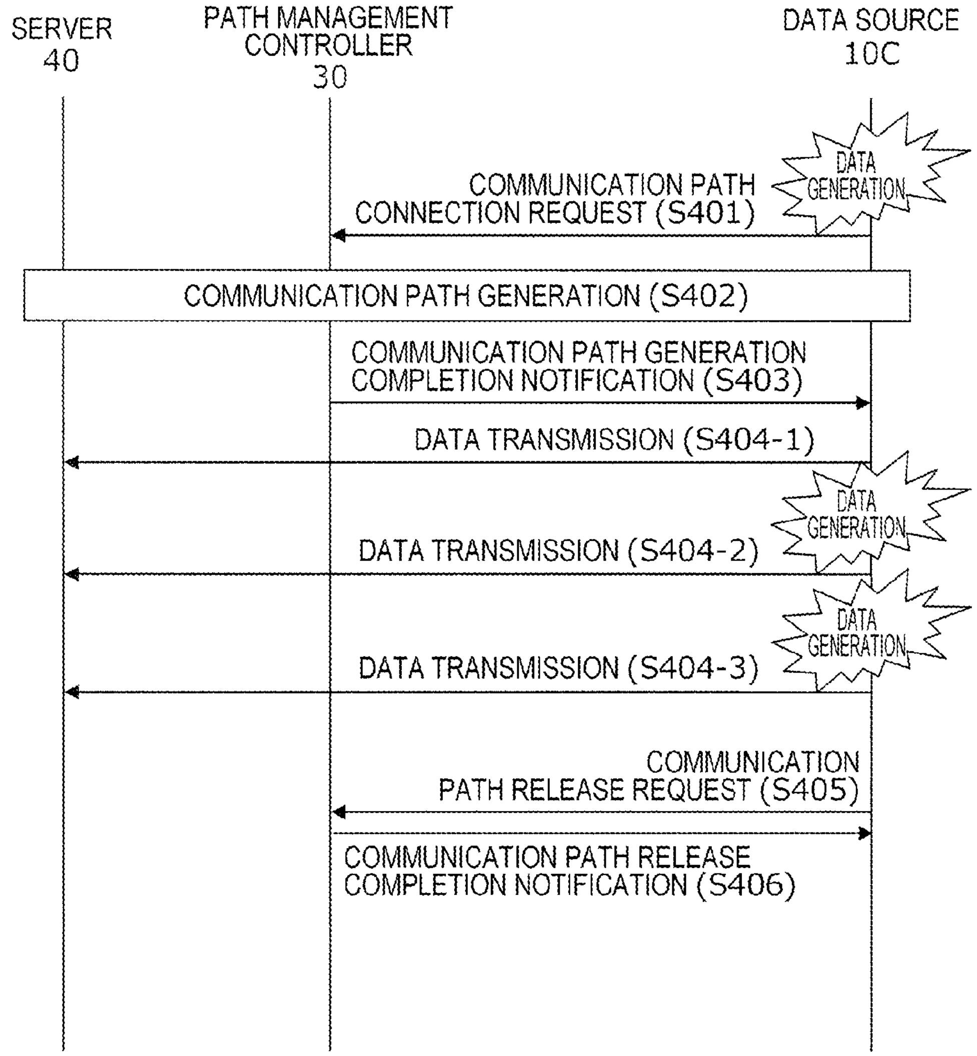
FIG. 16 illustrates an example of transmission of sensing data from a data source C to the server.

FIG. 16 illustrates an example of transmission of sensing data from the data source 10C to the server 40. The data source 10C transmits the sensing data according to the third transmission policy.

When data is generated in the sensor 50, the data source 10C transmits the generation request of the communication path to the path management controller 30 (S401).

When receiving the communication path generation completion notification (S403), the data source 10C transmits the sensing data to the server 40 (S404-1), and then waits for transmission of the release request of the communication path for the subsequent 20 ms. When sensing data is generated during that time, the sensing data is transmitted each time the sensing data is generated (S404-2 and S404-3).

When 20 ms elapses from the last data transmission (step S404-3), the data source 10C transmits the release request of the communication paths to the path management controller 30 (S405).

When receiving the release request of the communication paths, the path management controller 30 releases the communication paths of the network devices 81D and 81E, and transmits the communication path release completion notification indicating that the release of the communication paths is completed to the data source 10C (S406).

As illustrated in FIGS. 14 to 16, in the present embodiment, communication paths are allocated in a time division manner at necessary timings, whereby exhaustion of network resources is prevented, and RDMA communication with a large amount of data sources is implemented. Since the communication paths are allocated only for a necessary period to the data sources 10 from which sensing data is desired to be transmitted, path utilization can be improved, and network resources can be reduced.

The path management controller 30 has a function to monitor the data generation amount of each data source 10 and a generation status of the communication path, and may change the design of the communication path according to a monitoring result. In this case, when acquiring the data amount of each communication path, the path management controller 30 executes steps S31 to S36 again. The monitoring method is arbitrary, and for example, providing a counter for recording the data amount in the network devices 81A to 81E, and reading a value of the counter can be illustrated as an example.

Figure 17:
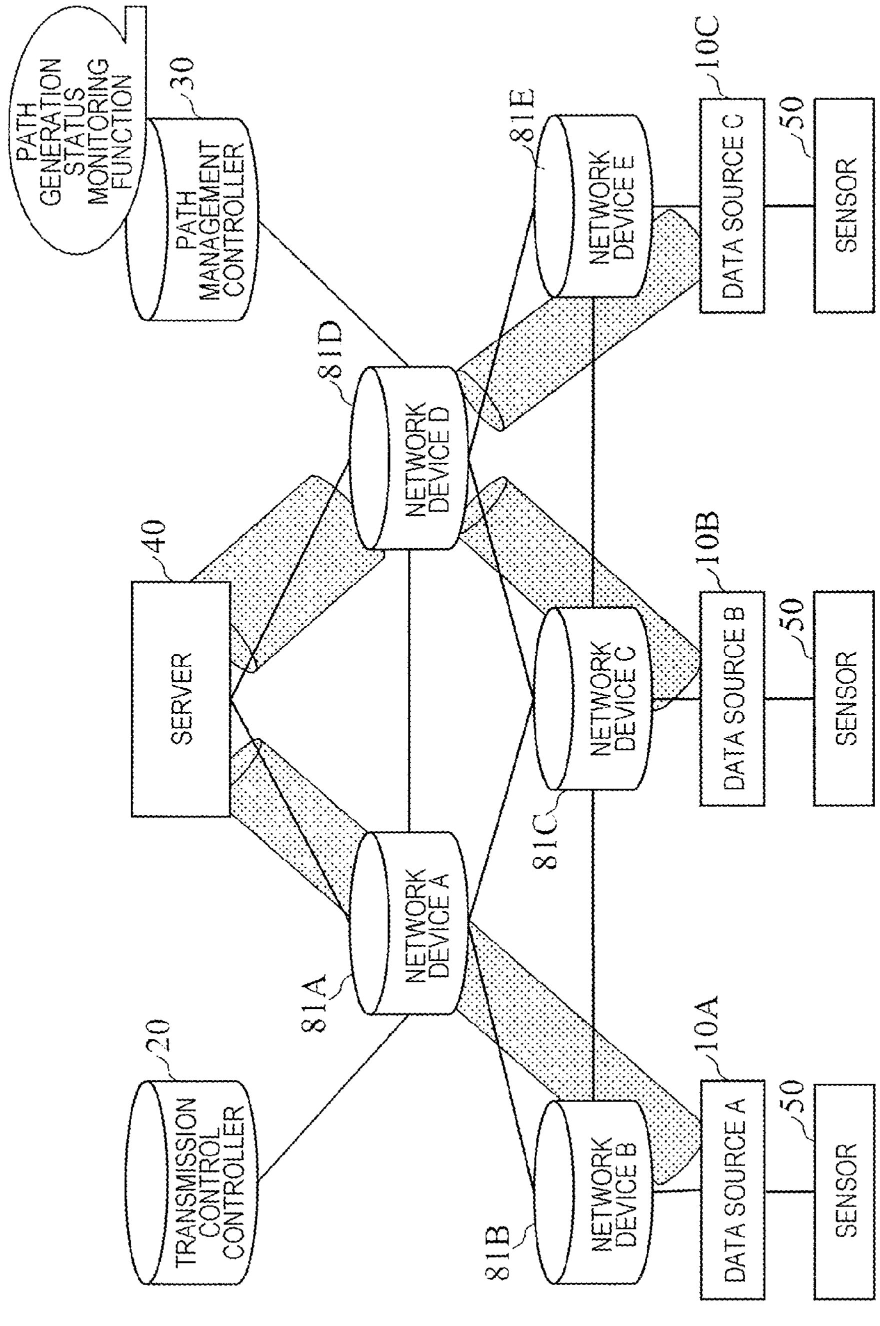
FIG. 17 illustrates a design example of a communication path.

For example, in a case where the generation frequency of the communication path of the data source 10C increases from 5 times/s to 10 times/s, the communication path is divided by the network devices 81E to 81D as illustrated in FIG. 17. A route passing through the network device 81A or a route passing through the network device 81D may be used from the data source 10B to the server 40. Therefore, the path management controller 30 sets the route passing through the network device 81D as the route from the data source 10B to the server 40. Then, the path between the server 40 and the network device 81D is constantly maintained, and only the communication path between the network device 81C and the network device 81D is generated at the time of data generation of the data source 10B, and only the path between the network device 81D and the network device 81E is generated at the time of data generation of the data source 10C. At the time of data generation of the data source A, only the path between the server 40 and the network device 81A is generated.

Second Embodiment

In the present embodiment, a transmission control controller 20 determines a transmission policy in consideration of entire NW resources. When the transmission policy is determined, a resource use amount of a case where each of the data sources A to C executes the transmission policy can be calculated. Although a method of calculating the resource use amount is arbitrary, for example, the following equations can be used.

$$\text{The resource use amount} = (\text{a path generation overhead} + \text{a transfer time} + \text{a path release standby time}) * \text{a path generation frequency}$$

The transfer time=a transfer data amount/a communication band

The path generation frequency=the data generation frequency*the data generation amount/an accumulation amount Here, the path generation overhead is a head portion indicating the connection request of a communication path, and may be any value. In the present embodiment, an example of 0.03 s is given as an example. The path release standby time corresponds to path release timing in the transmission policy.

Data source A

It is the transmission policy in which the data generation frequency is 4 times/s, the data generation amount is 5 MB/time, and the communication path is generated after 15 MB is accumulated.

The path generation frequency: 1.3 times/s=(5 [MB/time]×4 [times/s])/15 [MB]

The transfer time: 0.012 s=15 [MB]/(10 [Gb/s]/8)

The resource use amount: 0.056=(0.03+0.012+0)*1.3

Data source B

It is the transmission policy in which the data generation frequency is 10 times/s, the data generation amount is 10 MB/time, the communication path is generated after 20 MB is accumulated, and release of the communication path is waited for 0.05 s.

The path generation frequency: 5 times/s=(10 [MB/time]×10 [times/s])/20 [MB]

The transfer time: 0.016 s=20 [MB]/(10 [Gb/s]/8)

The resource use amount: 0.48=(0.03+0.016+0.05)*5

Data source C

It is the transmission policy in which the data generation frequency is 5 times/s, the data generation amount is 10 MB/time, the communication path is immediately generated, and release of the communication path is waited for 0.02 s.

The path generation frequency: 5 times/s

The transfer time: 0.008 s=10 [MB]/(10 [Gb/s]/8)

The resource use amount: 0.29=(0.03+0.008+0.02)*5

In a case where the resource use amounts of the respective data sources are 0.056, 0.48, and 0.29, a total resource use amount of a case where the data sources A, B, and C execute the transmission policies is 0.826.

Figure 18:
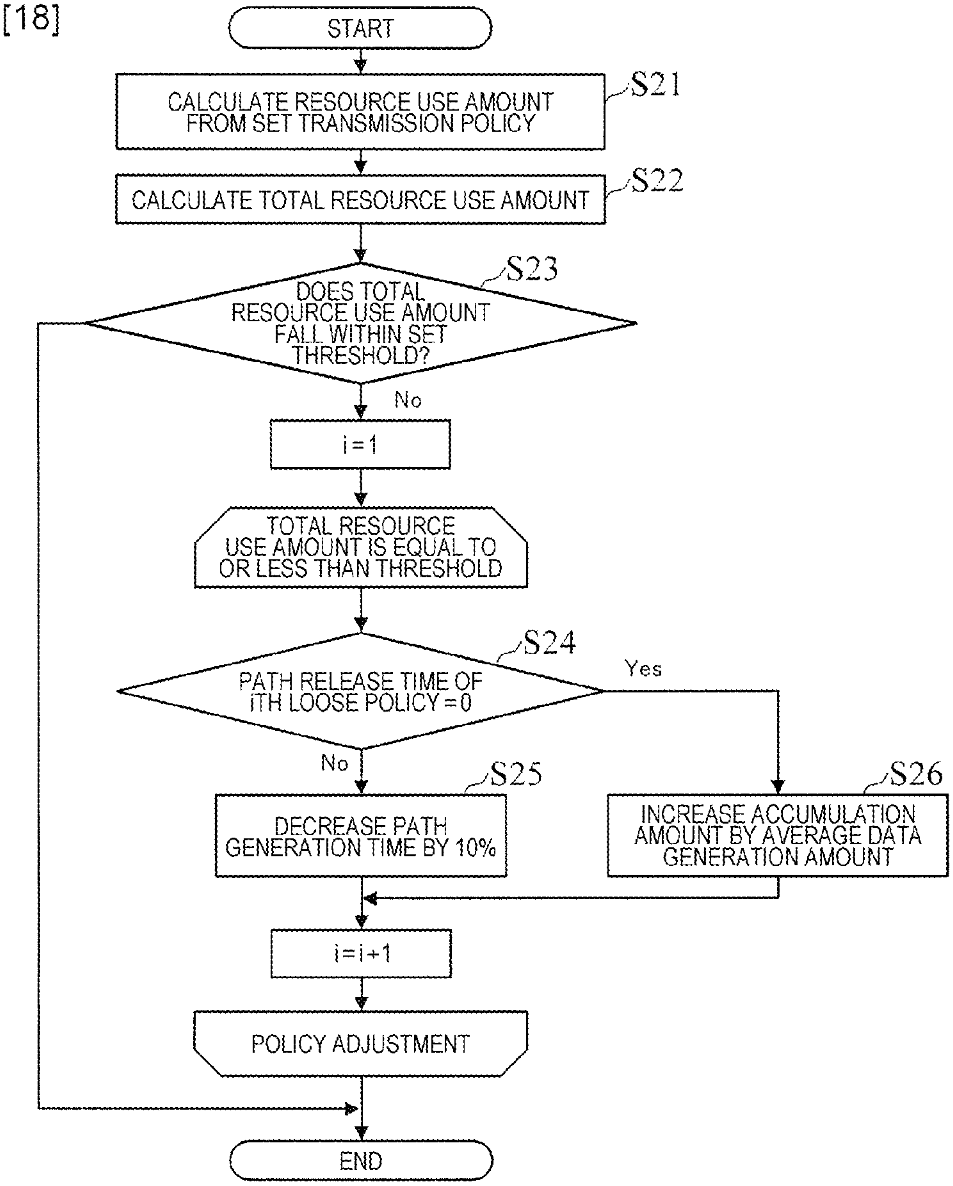
FIG. 18 illustrates an example of an operation in a transmission policy determination function.

The transmission policy determination function 22 adjusts the transmission policy with reference to the network resource DB 25. FIG. 18 illustrates an example of an operation in the transmission policy determination function 22.

The resource use amount is calculated using the set transmission policy (S21).

Next, the network resources are read from the network resource DB 25, and the total resource use amount is calculated (S22).

Next, whether the total resource use amount falls within a set threshold is determined (S23).

In a case where the total resource use amount falls within the set threshold (Yes in S23), the determination of the set transmission policy is terminated.

On the other hand, in a case where the total resource use amount does not fall within the set threshold (No in S23), the transmission policy of each data source is adjusted such that the total resource use amount becomes equal to or less than the set threshold. Specifically, in order of looseness of the transmission policy (S24), path release timing is advanced (S25), or the accumulation amount at the path generation timing is increased (S26). This can reduce a time in which the data source 10 with a loose transmission policy consumes network resources, and reduce the total resource use amount.

According to the requirement table of FIG. 5, the allowable delay time (1000 ms) of the data source A>the allowable delay time (200 ms) of the data source B>the allowable delay time (100 ms) of the data source C is satisfied. In this case, in step S24, the transmission policy is adjusted in the order of the data sources A, B, and C. In a case of Yes in step S23 only by the adjustment of the transmission policy of the data source A, the processing is terminated, or in a case where the transmission policy of the data source B also needs to be adjusted, the transmission policy of the data source B is also adjusted. In this manner, the present disclosure adjusts the transmission policy in descending order of the allowable delay time.

A case where the set threshold is 0.8, and the adjustment is performed by reducing the path release standby time of the transmission policy by 10% in step S25, and increasing the data accumulation amount by one time of data generation amount in step S26 will be described in detail.

Since the path release timing of the data source A is after data transmission completion and the path release standby time is 0, step S26 is executed. In step S26, the data accumulation amount is increased by 5 MB corresponding to one time of data generation amount. As a result, as illustrated in FIG. 19, the transmission policy is adjusted such that data is transmitted after 20 MB of data is accumulated.

The transmission policy of the data source A is the transmission policy of generating the communication path after 20 MB is accumulated. The resource use amount of the data source A at this time can be calculated as follows.

The path generation frequency: 1.0 times/s=(5 [MB/time]×4 [times/s])/20 [MB]

The transfer time: 0.016 s=20 [MB]/(10 [Gb/s]/8)

The resource use amount: 0.046=(0.03+0.016+0)*1.0

The transmission policy determination function 22 calculates the total resource use amount of the case where the data sources A, B, and C execute the transmission policies on the basis of the transmission policy of the data source A after adjustment, and compares the total resource use amount with a threshold. For example, since the resource use amount of the data source A after adjustment is 0.046, the total resource use amount of the case where the data sources A, B, and C execute the transmission policies is 0.816. Since the set threshold is 0.8, the transmission policy of the data source B with the next longest allowable delay time is adjusted.

Since the path release timing of the data source B is release when there is no data generation for 50 ms, step S25 is executed. In step S25, the path generation time is shortened by 5 ms, which is 10% of 50 ms. As a result, as illustrated in FIG. 19, the transmission policy is adjusted so as to release the path when there is no data generation for 45 ms.

The transmission policy of the data source B is the transmission policy of releasing the path when there is no data generation for 45 ms. The resource use amount of the data source B at this time is 0.455=(0.03+0.016+0.455)*5.

The transmission policy determination function 22 calculates the total resource use amount of the case where the data sources A, B, and C execute the transmission policies on the basis of the transmission policy of the data source B after adjustment, and compares the total resource use amount with a threshold. For example, since the resource use amount of the data source B after adjustment is 0.455, the total resource use amount of the case where the data sources A, B, and C execute the transmission policies is 0.719. Since the set threshold is 0.8 and the calculated value is below the threshold, the adjustment is completed.

In this manner, the transmission policy determination function 22 repeats steps S24 to S26 until the total resource use amount falls within the set threshold. Here, the processing in step S25 may be executed for the transmission policy in which the path generation timing is immediately after data generation, and step S26 may be executed for other transmission policies. Further, step S25 may be further executed for the transmission policy in which step S26 has been executed.

When the total resource use amount falls within the set threshold (Yes in S23), the transmission policy determination function 22 terminates the determination of the set transmission policy. When the determining of the transmission policy in the transmission policy determination function 22 ends, the transmission policy distribution function 23 distributes the transmission policy to each data source 10.

When receiving the transmission policy from the transmission control controller 20, the data source 10 stores the transmission policy in the transmission policy table 19. As a result, as illustrated in FIG. 19, the transmission policy table 19 of each of the data sources 10 stores the transmission policy suitable for the data source 10.

Effects of Present Disclosure

As described above, the present disclosure determines the transmission policy for each data source 10 and generates the communication path for each data source 10 in accordance with the transmission policy, and thus can allocate the communication paths in a time-division manner at necessary timing. Therefore, the present disclosure can perform control to reduce the communication path use time from each data source 10 to the server 40, facilitate reuse of the communication paths, and reduce the required number of communication paths for the entire communication network 80 with respect to the trade-off between immediacy of data transmission and reduction in communication path use time.

Therefore, the present disclosure can implement the lossless and broadband communication network 80 with the communication paths, and enable RDMA communication with a large number of data sources without requiring a large amount of network resources. Furthermore, the present disclosure can prevent data loss in the communication network 80, and thus can implement reliable data transfer using RDMA.

Note that, in the present embodiment, an example in which data collected by the server 40 is sensing data has been described. However, the present disclosure is applicable to any data required to be collected, such as data in user terminals, sensors, or in-vehicle systems.

Furthermore, in the above-described embodiments, an example of setting the lossless and broadband communication path between the data source 10 and the server 40 has been described. However, a transfer route of data of which quality is not guaranteed may be set as the communication path.

INDUSTRIAL APPLICABILITY

The present disclosure can be applied to the information communication industry.

REFERENCE SIGNS LIST

10, 10A, 10B, 10C Data source
20 Transmission control controller
30 Path management controller
40 Server
50 Sensor
11 Requirement notification function
12 Transmission policy reception function
13 Data transmission timing control function
14 Communication path setting function
15 Data transmission function
16 Communication path release function
17 Generated data storage function
18 Requirement table
19 Transmission policy table
21 Requirement reception function
22 Transmission policy determination function
23 Transmission policy distribution function
24 Transmission policy determination rule
31 Path setting request reception function
32 Path setting function
33 Path setting location table
34 Path design function
35 Path management table
41 Data reception function
42 Memory
43 Application
80 Communication network
81A, 81B, 81C, 81D, 81E Network device

The invention claimed is:

1. A system for collecting data from a plurality of data sources to a server, the system comprising:

a memory; and at least one computer including a path management controller configured to manage a communication path between the plurality of data sources and the server, wherein:

the path management controller is configured to adjust a section length of the communication path from each of the plurality of data sources to the server so as to shorten a time for generating the communication path for transmitting the data from the plurality of data sources to the server, wherein the path management controller is configured to perform operations comprising:

determining the section length of the communication path from each of the plurality of data sources to the server by:

lengthening the section length of a section in which a generation frequency of a communication path is less than a threshold, and maintaining the section length of a section in which the generation frequency of a communication path is equal to or greater than a threshold.

2. The system according to claim 1, wherein:

in a case where there is a network device in which data from two or more data sources among the plurality of data sources join, the path management controller is configured to divide a section length by the network device.

3. The system according to claim 1, wherein the path management controller is configured to perform operations comprising:

generating in advance a communication path for transferring data from two or more data sources among the plurality of data sources, and allocating the communication path to a data source when the data source using the communication path appears.

4. The system according to claim 1, wherein the path management controller is configured to perform operations comprising:

acquiring a generation frequency of a communication path in each network device;

and in a case where there is a section in which the generation frequency of a communication path has changed from less than a threshold to equal to or greater than the threshold, adjusting dividing the section length of the communication path in the section.

5. The method of claim 1, wherein lengthening the section lengthening the section length comprises extending the communication path to an additional network device.

6. A method executed by a system for collecting data from a plurality of data sources to a server, wherein the system includes at least one computer, the method comprising:

managing a communication path between the plurality of data sources and the server, and adjusting a section length of the communication path generated at a time of data transmission from each of the plurality of data sources to the server so as to shorten a generation time of the communication path at the time of data transmission from the plurality of data sources to the server, wherein the path management controller is configured to perform operations comprising:

determining the section length of the communication path from each of the plurality of data sources to the server by:

lengthening the section length of a section in which a generation frequency of a communication path is less than a threshold, and maintaining the section length of a section in which the generation frequency of a communication path is equal to or greater than a threshold.

7. A non-transitory computer readable medium storing a program for implementing a computer as a path management controller, wherein execution of instructions of the program cause the computer to perform operations comprising:

managing a communication path between the plurality of data sources and the server;

and adjusting a section length of the communication path generated at a time of data transmission from each of the plurality of data sources to the server so as to shorten a generation time of the communication path at the time of data transmission from the plurality of data sources to the server, wherein the path management controller is configured to perform operations comprising:

determining the section length of the communication path from each of the plurality of data sources to the server by:

lengthening the section length of a section in which a generation frequency of a communication path is less than a threshold, and maintaining the section length of a section in which the generation frequency of a communication path is equal to or greater than a threshold.

* * * * *